Patented May 23, 1944

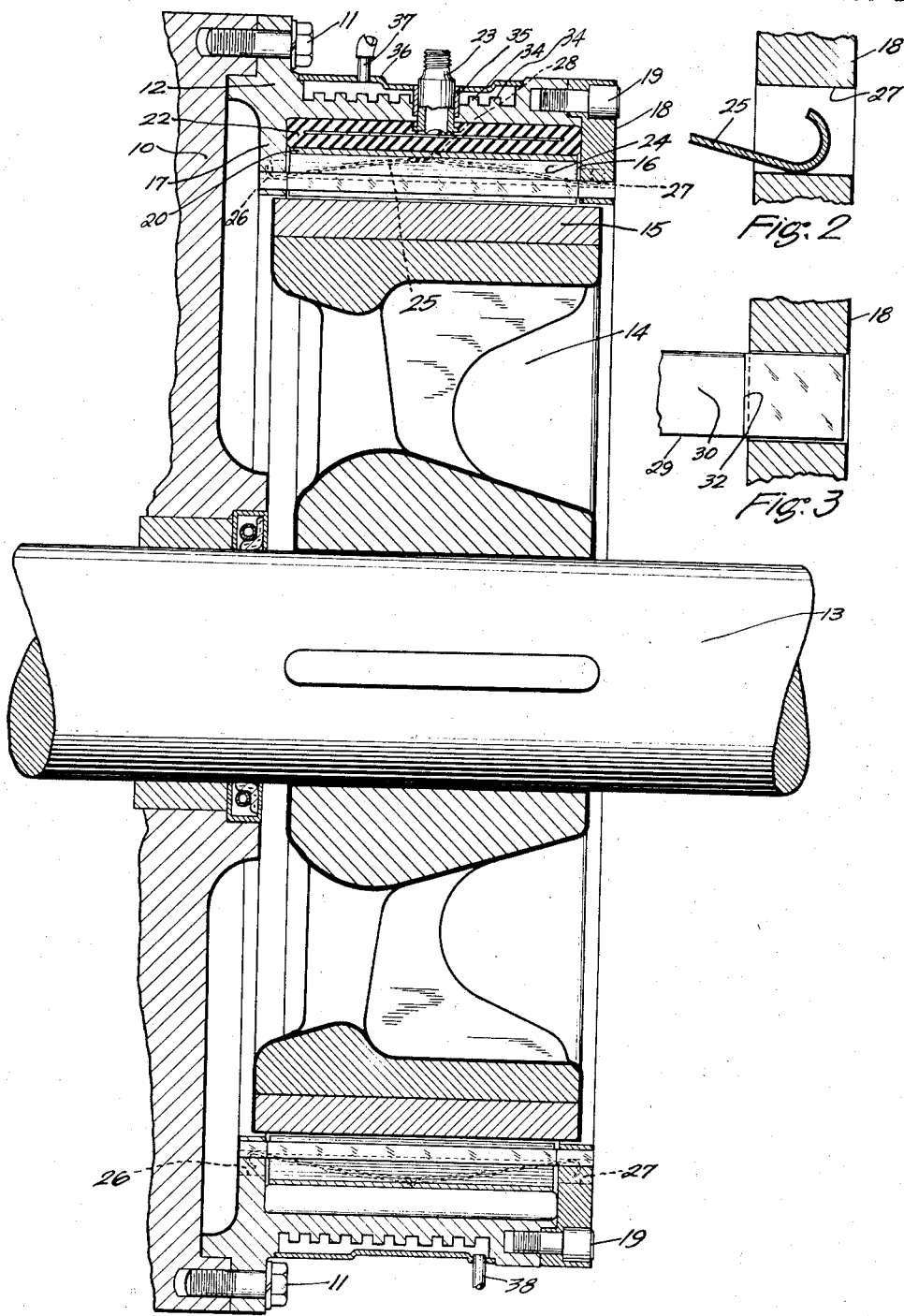

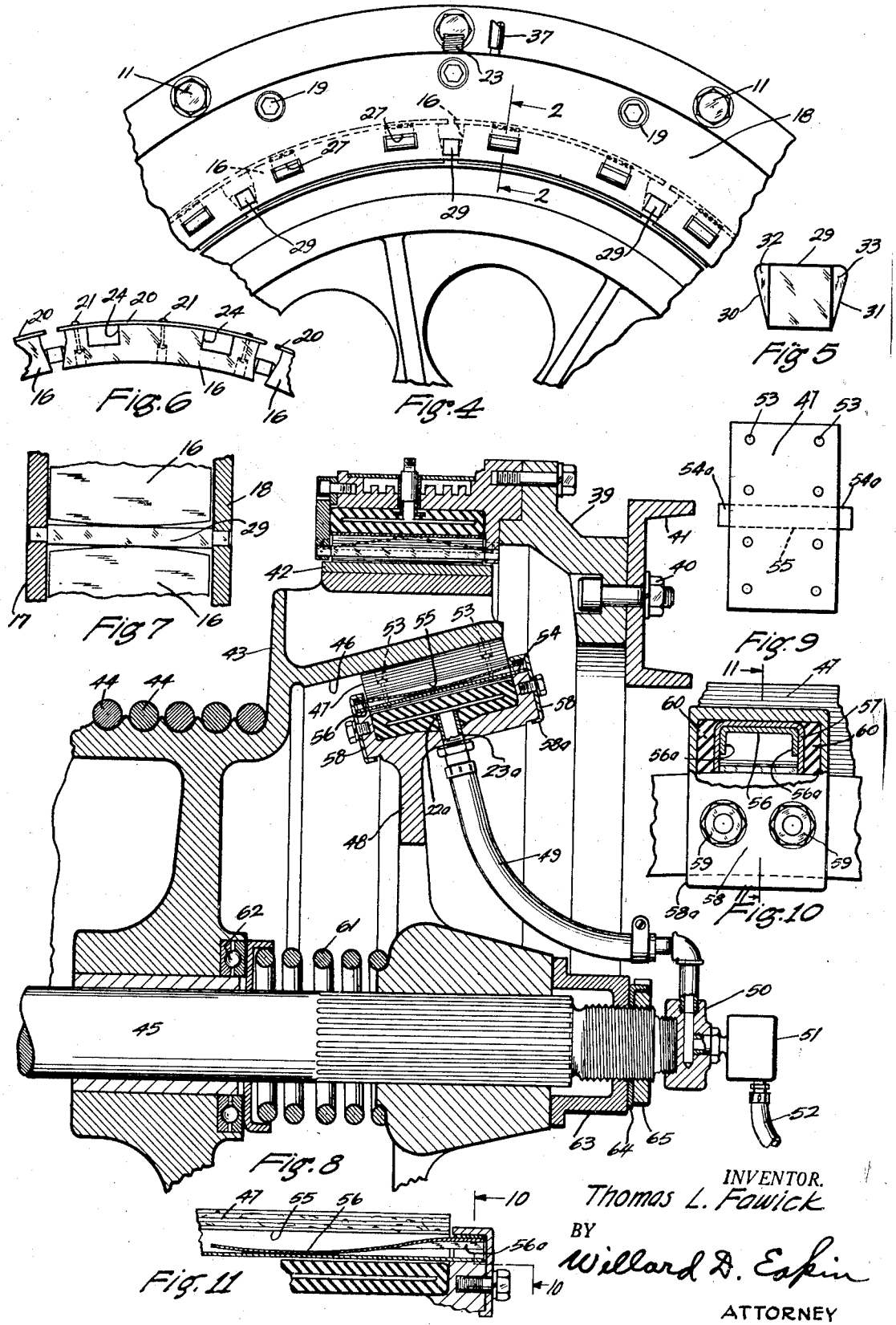

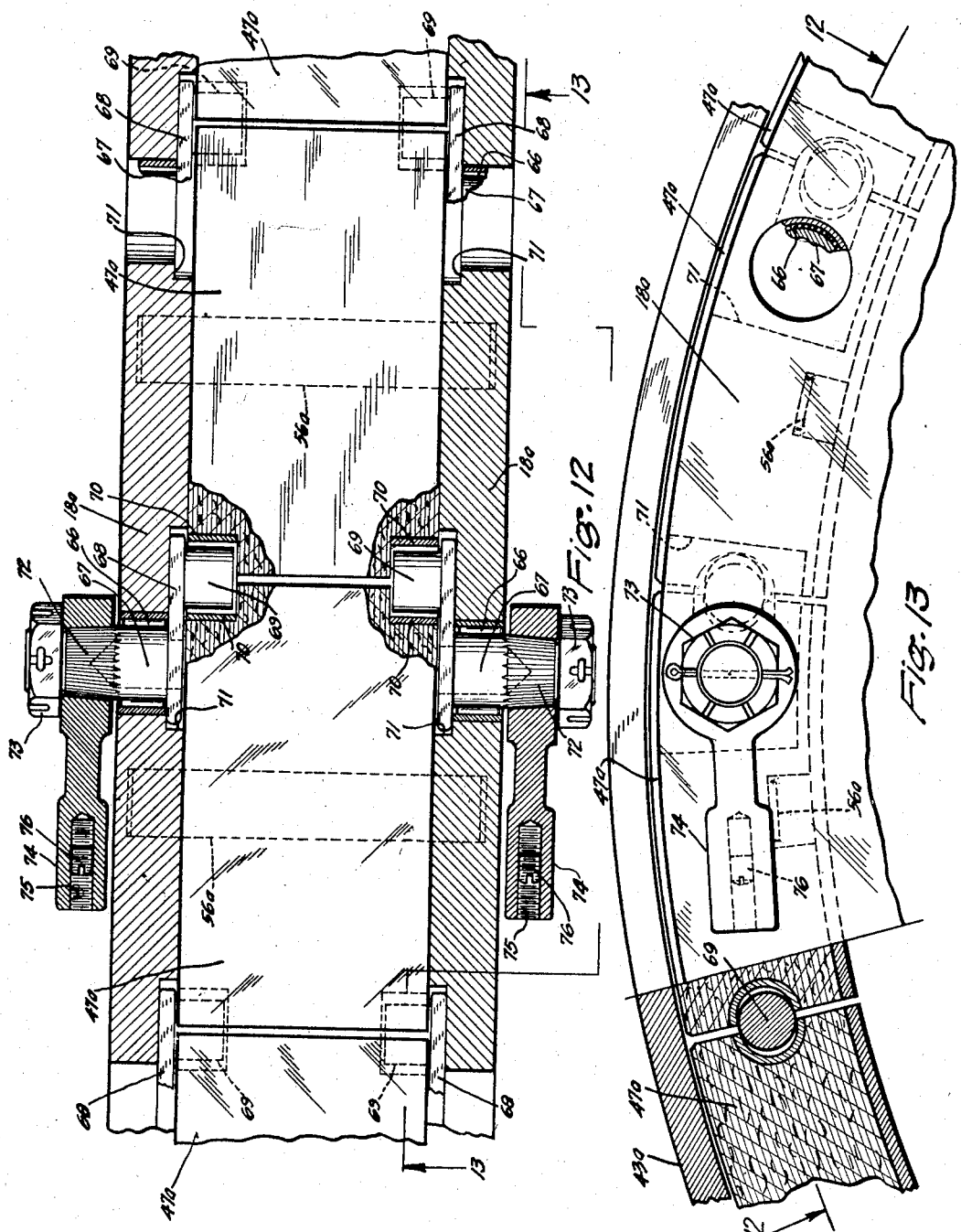

2,349,494

UNITED STATES PATENT OFFICE 2,349,494

ASSEMBLY FOR CLUTCHES AND BRAKES

Thomas L. Fawick, Akron, Ohio

Application May 2, 1941, Serial No. 391,509

14 Claims. (Cl. 188—152)

This invention relates to assemblies suitable for use as clutches or brakes and in combinations of the two.

Its chief objects are simplicity and economy of construction, dependability and long life in operation, ease of assembly and disassembly and repair, avoidance of harmful effects of frictional heat, the provision of a torque cushioning effect, and, alternatively, the avoidance or modification of the effects of centrifugal force in devices of the class of those described.

Of the accompanying drawings:

Fig. 1 is an axial section of a preferred embodiment of my invention as applied to a brake.

Fig. 2 is a fragmentary section, on line 2—2 of Fig. 4, of parts of the same on a larger scale than that of Fig. 1.

Fig. 3 is a fragmentary section showing other parts on a larger scale than that of Fig. 1.

Fig. 4 is a fragmentary end elevation of the brake assembly of Fig. 1, as viewed from the right of that figure.

Fig. 5 is an end view of one of the torque-transmitting bars of Fig. 1, but on a larger scale.

Fig. 6 is a fragmentary end elevation of parts of the assembly shown in Fig. 1, with a retaining ring removed for greater clearness of illustration.

Fig. 7 is a fragmentary tangential section illustrating a torque cushioning feature adapted to be employed in either of the embodiments shown.

Fig. 8 is an axial section of an assembly embodying the invention in its preferred form and comprising a clutch and a brake in association with each other.

Fig. 9 is a face view of a friction block and its base plate as employed in the clutch of Fig. 8.

Fig. 10 is a fragmentary view, with a part broken away and parts in section, on line 10, 10 of Fig. 8.

Fig. 11 is a section on line 11—11 of Fig. 10.

Fig. 12 is a section, on line 12—12 of Fig. 13, showing provision for avoidance or modification of centrifugal force effects, but with parts shown in face view.

Fig. 13 is an elevation of that same construction, with parts sectioned on line 13, 13 of Fig. 12.

Referring to the drawings, the brake assembly shown in Figs. 1 to 7 comprises a stationary member 10 such as a transmission housing having secured to its outer periphery by means of capscrews 11, 11 an annular, outer, brake-shoe-mounting member 12 and having journaled in it a driving shaft 13 which has keyed upon it a brake drum 14 provided with a pressed-on friction ring 15.

A circumferential series of brake shoes 16, 16 adapted to be moved radially inward to engage the friction ring 15 are mounted in an inwardly facing channel defined by an internal flange 17 on the member 12 and a retaining ring 18 secured to the member 12 by screws 19, 19.

In the said channel, and adapted to bear against base plates 20, 20 secured to the friction shoes 16, as by rivets 21, 21 (Fig. 6) is an inwardly-distensible rubber bag 22, preferably of such cross-section that its chamber is of almost no volume when the bag is not charged with distending pressure fluid, the bag being provided with means comprising an inlet-outlet stem 23 for charging and venting it to effect brake-engagement and disengagement.

For assuring collapse of the bag upon its being vented, and retraction of the friction shoes from the brake drum, each of the friction shoes is formed, on its side next to its base plate, with a transverse slot 24 (Fig. 6) near each of its ends, in each of which slots is mounted a bow-like spring 25 bearing at its middle outwardly against the base-plate 20 of the friction block and at its ends bearing inwardly against the radially inner walls of rectangular holes 26, 26 formed in the flange 17 of the member 12 and of similar holes 27, 27 formed in the retaining ring 18. For assuring retention of the springs in place, each preferably is formed at its middle with a stamped-out detent adapted to snap into a dimple 28 (Fig. 1) formed in the base plate 20 of the friction shoe.

For transmission of braking torque from the stationary member 12 to the brake-drum 14 a circumferential series of bars 29, 29 are mounted between the friction shoes and have squared ends fitting complemental holes formed in the flange 17 of the member 12 and similar holes formed in the retaining ring 18.

Between its squared ends each of the bars 29 is formed with front and rear faces 30, 31 which converge toward the axis of rotation (Fig. 5), and the end faces of each individual wear shoe are parallel with each other in their portions which contact the bars 29, so that no looseness occurs between the bars and the wear shoes in the inward and outward movement of the latter for brake engagement and disengagement, such as would occur if the contacting surfaces were radial. The shape of the bars 29 also provides shoulders 32, 33 for keeping the bars in place between the flange 17 and the retaining ring 18.

To provide torque-cushioning, whether the assembly is used as a brake or as a clutch, the end faces of the friction shoes can be given curved form as shown in Fig. 7 and the bars can be of such size and of such bend-resistance in relation to the torque load as to yield appreciably by bending and thus cushion the torque.

An advantage of the construction shown in Figs. 4 to 7 is that the end faces of the wear shoes which contact the faces 30 and 31 (Fig. 5) of the bars, in being parallel to each other as to those of each block, are so non-radial with relation to the axis of rotation that the torque urges the shoes inwardly on the principle of the inclined plane and thus provides a self-energizing effect.

The member 12 can be formed with cooling ribs 34, 34 on its outer face and a chamber for circulation of cooling fluid can be formed by a sleeve 35 loosely surrounding the stem 23 of the bag 22 and sealed to the member 12 and a wall member 36 sealed to the member 12 and the sleeve 35 and provided with an inlet hose-nipple 37 and an outlet hose-nipple 38.

The construction is such that, with the retaining ring 18 removed, the springs can be readily pulled out of the assembly endwise, and then the bars and the brake shoes likewise removed, after which the distensible bag can readily be removed, for replacement or repair, and the assembling operation, consisting of the same steps in reverse order, can be easily and quickly performed.

In the embodiment illustrated in Figs. 8 to 11 a constricting type brake assembly corresponding in all respects to that of Figs. 1 to 7 is mounted upon a stationary ring member 39 supported as by bolts such as the bolt 40 upon frame members such as the member 41 and is adapted to coact with a friction ring 42 which is mounted upon a bell-shaped cable-belt pulley member 43 formed with grooves for a set of cables 44, 44.

The belt-pulley member 43 is journaled upon a driving shaft 45 and is internally formed with a conical friction face 46 adapted to be engaged by a circumferential series of friction blocks or shoes such as the shoe 47 which are carried by a cone-clutch hub 48 slip-splined upon the driving shaft 45.

This clutch structure comprises a rubber actuating bag 22ª corresponding to the bag 22 of Fig. 1 except that it is of conical shape and has its inlet-outlet stem, 23ª, on its inner periphery and extending through a hole in the floor of a channel formed in the outer periphery of the hub member 48. The bag is stretched or "buttoned" into place in the channel and its inlet-outlet stem is connected by a flexible hose 49 with a rotary-seal assembly 50 mounted upon the end of the shaft 45 and having its non-rotating part, 51, connected to a charging-and-venting hose 52.

Each of the shoes 47 is secured, as by rivets 53, 53, to a base plate 54, which is required to sustain only the light force necessary for retracting the shoes and consequently can be of thin sheet metal, and on its face next to its base plate each friction shoe is formed at its middle with a transverse groove 55 adapted to accommodate a shoe-retracting bow-like spring 56 which at its middle bears inwardly against the base plate of the shoe and at each of its ends bears outwardly against a stamped-metal saddle 57 which is slidably retained in a hood-like metal retaining cap 58 secured by cap-screws 59, 59 to a flat annular face of the clutch-hub member 48.

The springs 56 not only are adapted to retract the friction shoes 47 when the bag 22ª is vented but they also transmit torque from the cap members 58 to the friction shoes 47.

To avoid excessive strain upon the cap-screws 59 the hood portion of the cap member 58 preferably bears, with edge faces of the hood, against the outer peripheral face of the hub member 48 and the cap member can be formed with a flange 58ª engaging under an annular over-hand of the hub member for the same purpose.

Torque-cushioning can be provided by interposing a rubber block 60 between each radial wall of the saddle member 57 and the adjacent radial wall of the cap member 58 and the rubber blocks preferably are bonded to the saddle members and to the cap members by vulcanized adhesion.

The base-plate of each friction shoe 47 preferably is formed at its middle with ears 54ª, 54ª projecting beyond the friction shoe and adapted to extend into the respective cap members 58 and they can be made of such width as to assist the springs in sustaining the torque.

If it is desired that the springs take all of the torque, each spring preferably is given greater strength by being provided in its end portions with bent-down flanges 56ª, 56ª (Figs. 8 and 10).

To provide for adjustment made desirable by wear of the friction shoes the clutch-hub member 48 is, as above stated, slip-splined upon the shaft 45 and adapted to be set up, against the force of a spring 61 backed by a thrust bearing 62, by the setting up of a cup-shaped nut 63 threaded upon the end portion of the shaft 45 and backed by a lock-washer 64 and a lock-nut 65.

Figs. 12 and 13 illustrate an embodiment which is in general similar to the clutch portion of the assembly shown in Figs. 8 to 11, the torque being transmitted, but with some play for torque cushioning by the fluid-distensible bag, by a shoe-retracting spring 56ª mounted in a slot midway of the length of each shoe, except that instead of the retaining caps 58 of Figs. 8 to 11 retaining rings 18ª, 18ª, each generally similar to the retaining ring 18 of Figs. 1 to 4, are employed, and provision is made for avoiding or modifying the effect of centrifugal force of the shoes, 47ª, 47ª.

For this purpose the retaining rings 18ª are formed with suitable apertures for needle-point bearings 66, 66 in which are mounted the hubs 67, 67 of levers 68, 68 which are formed at their outer ends with laterally projecting cylindrical crank-pins 69, 69 each of which extends into the space between a pair of semi-cylindrical metal liners 70, 70 which are secured by adhesion in the adjacent ends of adjacent wear shoes 47ª, and preferably are flush with end faces of the latter. Each pair of liners thus defines a space which, by reason of the fact that the shoes are slightly spaced apart, is oblong in the direction of rotation, which permits torque-cushioning in spite of the fact that the hubs 67 of the levers 68 are mounted on fixed axes in the retaining rings 18ª.

The retaining rings 18ª preferably are formed with recesses 71, 71 to accommodate the levers 68, so that the wear shoes can be of uniform width throughout their length without such open spaces as would permit excessive bulging and pinching of the fluid-distensible actuating bag.

The hub 67 of each lever 68 projects beyond the outer face of the adjacent retaining-ring 18ª and the projecting portion of each is formed with taper serrations 72 and has mounted thereon, and secured by a nut 73, the hub of a counter-weight lever 74 for avoiding or modifying the effect of centrifugal force of the wear-shoes 47ª and other parts associated with them.

Each of the counter-weight arms 74 is formed with a threaded bore 75 extending from its outer end and in the bore is screwed an adjusting weight 76.

According to the relative weights and leverages employed, the effects of centrifugal force of the parts can be substantially neutralized as to all speeds, so that the springs 56 will quickly effect disengagement of the wear shoes 47ª from their mating friction ring, 43ª, upon the venting of the fluid-distensible actuating bag, or, with different weights and leverages employed, the centrifugal effects of the shoes and associated parts can be only partially offset, so that the frictional engagement force will increase with increase of speed. Also, with still different weights and leverages employed, so that the centrifugal force of the levers 74 predominates over that of the other parts, their centrifugal force can be employed for assisting the springs 56ª in effecting disengagement of the shoes 47ª from the friction ring 43ª.

The assemblies described provide the advantages set out in the above statement of objects, and various modifications are possible within the scope of the appended claims.

I claim:

1. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means engaging said rigid means and said wear shoes for transmitting torque from one of the same to the other, and retaining means detachably secured to said rigid means for retaining the said interlocking means in position, the said interlocking means being removable from said rigid means by relative movement in a direction lying in an axial plane of the assembly but only when the said retaining means is not in position, the said retaining means comprising a circumferential series of hood-shaped cap members detachably secured to said rigid means.

2. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means interposed operatively between said rigid means and said wear shoes for transmitting torque from one of the same to the other, resilient means being interposed operatively between the said wear shoes and the said rigid means for cushioning the torque.

3. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means engaging said rigid means and said wear shoes for transmitting torque from one of the same to the other, the said interlocking means comprising a circumferential series of bars and the wear shoes being formed with curved faces for engagement with the bars for cushioning of the torque by springing of the bars.

4. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, interlocking means interposed operatively between said rigid means and said wear shoes for transmitting torque from one of the same to the other, and resilient means interposed between the said interlocking means and the said rigid means for cushioning the torque.

5. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means engaging said rigid means and said wear shoes for transmitting torque from one of the same to the other, the said interlocking means and the wear shoes being removable from the said rigid means by relative sliding movement in a direction lying in an axial plane of the assembly, the said interlocking means comprising a circumferential series of members having non-radial wear-shoe-engaging faces and the wear shoes having non-radial faces mating therewith for self-energizing effect.

6. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means engaging said rigid means and said wear shoes for transmitting torque from one of the same to the other, the said interlocking means comprising a circumferential series of bars and the wear shoes being formed with curved end faces for engagement with the bars for cushioning of the torque by springing of the bars.

7. The combination of two relatively rotatable structures, one of the same having a frictional engagement surface and the other comprising a circumferential series of wear shoes adapted to engage said frictional engagement surface, a fluid distensible member for effecting such engagement, and counterbalance means providing centrifugal force opposed to that of said wear shoes.

8. The combination of two relatively rotatable structures, one of the same having a frictional engagement surface and the other comprising a circumferential series of wear shoes adapted to engage said frictional engagement surface, a fluid distensible member for effecting such engagement, and counterbalance means providing centrifugal force opposed to that of said wear shoes, the said counterbalance means comprising a two-armed lever structure having one of its arms in radially interlocked relation to two of the wear shoes.

9. The combination of two relatively rotatable structures, one of the same having a frictional engagement surface and the other comprising a circumferential series of wear shoes adapted to engage said frictional engagement surface, a fluid distensible member for effecting such engagement, and counterbalance means providing centrifugal force opposed to that of said wear shoes, the said counterbalance means comprising a lever arm radially interlocked with at least one of the wear shoes but with circumferential play for permitting cushioning of torque by the fluid distensible member.

10. The combination of two relatively rotatable structures, one of the same having a frictional engagement surface and the other comprising a circumferential series of wear shoes adapted to engage said frictional engagement surface, a fluid distensible member for effecting such engagement, and counterbalance means providing centrifugal force opposed to that of said wear shoes, the said counterbalance means comprising a lever arm and a weight member adjustably mounted thereon.

11. The combination of two relatively rotatable structures, one of the same having a frictional engagement surface and the other comprising a circumferential series of wear shoes adapted to engage said frictional engagement surface, a fluid distensible member for effecting such engagement, and counterbalance means providing centrifugal force opposed to that of said wear shoes, the said counterbalance means comprising a lever arm formed with a longitudinal threaded bore and a weight member screwed into said bore.

12. The combination of two relatively rotatable structures, one of the same having a frictional engagement surface and the other comprising a circumferential series of wear shoes adapted to engage said frictional engagement surface, a fluid distensible member for effecting such engagement, a base member and a side member detachably secured thereto and therewith defining a channel seat for said fluid distensible member, and counterbalance means mounted on said side member and providing centrifugal force opposed to that of said wear shoes.

13. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means engaging said rigid means and said wear shoes for transmitting torque from one of the same to the other, the said interlocking means comprising a circumferential series of bars and the wear shoes and the bars being so formed on their contacting faces as to provide cushioning of the torque by springing of the bars.

14. The combination of two relatively rotatable structures, one of the same having a frictional engagement surface and the other comprising a circumferential series of wear shoes adapted to engage said frictional engagement surface, a fluid-distensible member for effecting such engagement, rigid means providing a mounting for said fluid-distensible member, and interlocking means engaging said rigid means and said wear shoes for transmitting torque from one of the same to the other, the said interlocking means comprising a circumferential series of members having non-radial wear-shoe-engaging faces for guiding the wear shoes in their radial movement and for transmitting torque and the wear shoes having non-radial faces mating therewith, and the directions of the engaging movements of the wear shoes being such in relation to the non-radial characteristics of said faces as to cause the torque to act through said faces, upon the principle of the inclined plane, for self-energizing effect, the mating faces in each pair being inclined in such direction in respect to the radii extending through them that the said wear shoes are urged into firmer contact with said engagement surface by the torque sustained by that contact.

THOMAS L. FAWICK.